(12) United States Patent
Glebe

(10) Patent No.: US 7,840,606 B2
(45) Date of Patent: Nov. 23, 2010

(54) SYSTEMS, METHODS, AND ARTICLES OF MANUFACTURE FOR PERFORMING PRODUCT AVAILABILITY CHECK

(75) Inventor: Thorsten Glebe, Leimen (DE)

(73) Assignee: SAP AG, Walldorf (DE)

( * ) Notice: Subject to any disclaimer, the term of this patent is extended or adjusted under 35 U.S.C. 154(b) by 1188 days.

(21) Appl. No.: 11/025,032

(22) Filed: Dec. 30, 2004

(65) Prior Publication Data

US 2006/0036516 A1 Feb. 16, 2006

(30) Foreign Application Priority Data

Jul. 22, 2004 (EP) .................................. 04017345

(51) Int. Cl.
*G06F 17/30* (2006.01)
(52) U.S. Cl. ...................... 707/803; 707/826
(58) Field of Classification Search ................. 707/803, 707/826
See application file for complete search history.

(56) References Cited

U.S. PATENT DOCUMENTS

| 5,953,707 | A | | 9/1999 | Krasinski et al. | |
| 6,119,102 | A | * | 9/2000 | Rush et al. | 705/29 |
| 6,766,334 | B1 | * | 7/2004 | Kaler et al. | 707/203 |
| 2002/0042756 | A1 | * | 4/2002 | Kumar et al. | 705/26 |
| 2002/0072986 | A1 | * | 6/2002 | Aram | 705/26 |
| 2002/0120935 | A1 | * | 8/2002 | Huber et al. | 725/60 |
| 2002/0152103 | A1 | * | 10/2002 | Ojha et al. | 705/8 |
| 2003/0018528 | A1 | * | 1/2003 | Sakatsume et al. | 705/14 |
| 2004/0010454 | A1 | | 1/2004 | Helmolt et al. | |
| 2005/0028091 | A1 | * | 2/2005 | Bordawekar et al. | 715/514 |

OTHER PUBLICATIONS

Bartsch H., Bickenbach P., Supply Chain Management mit SAP AOP Supply-chain-Modelle mit dem Advanced Planner & Optimizer 3.1, 2002, Galileo Press, pp. 205-216.
European Search Report and Communication, mailed Feb. 23, 2005 (11 pages).

* cited by examiner

*Primary Examiner*—Neveen Abel-Jalil
*Assistant Examiner*—Son T Hoang
(74) *Attorney, Agent, or Firm*—Finnegan, Henderson, Farabow, Garrett & Dunner L.L.P.

(57) ABSTRACT

A computer-implemented method performs a product availability check. The method comprises receiving a plurality of first data sets. The method further comprises deriving, based on the first data sets, one or more second data sets. Based on the second data sets, result information on the availability of one or more products in dependence of time is then derived.

8 Claims, 5 Drawing Sheets ically known product availability check are discussed in more detail by way of example with reference to FIG. 4. The conventional
SYSTEMS, METHODS, AND ARTICLES OF MANUFACTURE FOR PERFORMING PRODUCT AVAILABILITY CHECK

RELATED APPLICATIONS

This application claims the benefit of European Patent Application No. 04017345.2, filed Jul. 22, 2004, the content of which is expressly hereby incorporated by reference in its entirety.

BACKGROUND

1. Technical Field

The present invention generally relates to the field of electronic product availability checks, and addresses computational performance issues in such availability checks.

2. Background Information

In modern industries, supply chain management has become an important tool in the planning and organization of business processes. ATP (Availability-to-Promise) checks, also known as availability checks, allow to ensure that a company can provide a requested product at a requested time in a requested quantity. Among ATP checks, there is known a product availability check, which carries out the availability check against what is referred to as the ATP quantity. In other words, the product availability check calculates the available amount of a product at a certain time. The ATP quantity is calculated from stock, planned receipts (production orders, purchase orders, planned orders and so on), and planned requirements (sales orders, deliveries, reservations and so on).

Product availability checks use ATP time series as input data. ATP time series represent incoming and outgoing movements (receipts and issues) for specific products. In an ATP time series, the receipt, requirements and stock elements are managed in aggregated (time-based) form. ATP time series are managed separately for each planning object and updated when changes are made to this planning object. Typically, aggregation occurs on a daily basis, but other periods of aggregation are conceivable, as well. ATP time series thus represent the current planning situation for the planning object for a series of points of time or time periods (buckets).

In a known solution implemented, e.g., in software packages SAP R/3 and SAP APO by SAP AG, Walidorf, and enabling a characteristics-based product availability check, the individual ATP time series includes a key consisting of category, sublocation, version and one or more valuated characteristics. This key uniquely identifies the particular ATP time series. Category refers to the particular type of stock, receipts and requirements that are to be considered in the product availability check. By choosing one or more categories, the user can define the scope of the availability check. Created production orders and released production orders are but two examples of categories. Sublocation and version correspond respectively to the storage location in a plant and the batch of the product. Characteristics may refer to features such as color, size, weight and length of the product. For more information on product availability checks and ATP time series, it is referred to Helmut Bartsch, Peter Bickenbach: "Supply Chain Management mit SAP APO—Supply-Chain-Modelle mit dem Advanced Planner & Optimizer 3.1", SAP Press, $2^{nd}$ edition, 2002, ISBN No. 3-89842-111-2, the content of which is herewith expressly incorporated by reference.

In the following, procedures of the conventionally known product availability check are discussed in more detail by way of example with reference to FIG. 4. The conventional embodiment is capable of checking the availability of a particular product against an incoming requirement (demand) to determine if the requirement can be fully or partially satisfied or must be declined (also referred to hereinafter as category-independent ATP check), or obtaining a product availability overview where the free amounts of a particular product are calculated in dependence of time and category (also referred to hereinafter as category-dependent ATP check). In both types of the ATP check, availability information is calculated on various levels such as plant level, sublocation level, version level, sublocation & version level, version & characteristics level, etc. In the category-independent ATP check, the minimum of the results on the levels is used as the total result of the check. For each level check, a separate ATP stack is filled based on the input ATP time series data. The input data is exploded with respect to sublocation, version and characteristics and stored in a linear structure with indexed access before it is filled into the stacks. The linear structure is referred to herein as exploded bucket array.

On the left-hand side of FIG. 4, three exemplary data sets 10, 12, 14 are depicted. Each of the data sets 10, 12, 14 represents an aggregated planning situation for a specific product with regard to a particular time bucket (e.g., day or shift) and category. For example, the data set 10 indicates that in a category C1, which in the example considered is stock-related, an aggregated quantity q1 of the product having version V and characteristics CK is required to be on stock at a time t1 in a sublocation S. The data set 12 indicates that with regard to a category C2, which in the example case is a receipt order, an aggregated quantity q2 of the product of version V and characteristics CK will be received in sublocation S at a time t2. Further, the data set 14 indicates that with regard to a category C3, which in the present example represents an issue order, an aggregated quantity q5 of the product has to be delivered at a time t5, regardless of the product's version, characteristics and storage location.

In the example, it is assumed that the time t1 is earlier than t2, which in turn is earlier than t5. Also, it is assumed that the sum of the quantities q1 and q2 is greater than the quantity q5, with q5 greater than q2.

The data sets 10, 12, 14 are input data to the product availability check and are also referred to herein as first data sets. Each of the data sets 10, 12, 14 constitutes, or is part of, a different ATP time series. While in the example considered, data for a single bucket only is illustrated in relation to each ATP time series, a person of ordinary skills in the art will appreciate that each ATP time series may, and typically will, contain data for a plurality of buckets so as to reflect a sequence or series of planning situations. Further, in the example considered, time series data in a single category only is input for each of stock, receipt, and issue. However, it will be readily appreciated that there may be issue-related input data sets or receipt-related input data set or stock-related input data sets in more than one category. As an example, there may be a fourth input data set (not illustrated in the drawings) in a different stock category than C1 or a different receipt category than C2 or a different issue category than C3.

The parameters: category, sublocation, version and characteristics together form a key (hereinafter also referred to as a first key) that is included in each input data set 10, 12, 14. This key uniquely identifies the corresponding ATP time series. The various parameters form elements of the key. They specify product-related conditions. As for the data set 10, the key element "category" has the value "C1", the key element "sublocation" has the value "S", the key element "version" has the value "V", and the key element "characteristics" has the value "CK". Thus, (C1, S, V, CK) is the key of the ATP time series associated with the data set 10. Similarly, (C2, S, V, CK) is the key of the ATP time series associated with the data set 12. As for the data set 14, the key element "category" has the value "C3", and the remaining key elements "sublocation", "version" and "characteristics" all have the value "-" indicating that no particular sublocation, version and characteristics are required for the product. Consequently, (C3, -, -, -) is the key of the ATP time series associated with the data set 14.

In the context of the present invention, the key element "category" can be viewed as a primary key element, and the other key elements "sublocation", "version" and "characteristics" can be viewed as secondary key elements. It will be readily appreciated by one of ordinary skills in the art that the primary and secondary key elements are not limited to those described above and may include any number and type of parameters.

According to the known method of performing product availability checks, the input ATP time series data is exploded with respect to the secondary key elements sublocation, version and characteristics both for the purpose of category-dependent ATP checks and category-independent ATP checks. The exploded data is stored in a linear array referred to as exploded bucket array. Bucket arrays are created separately for issues, receipts and stock. Thus, three bucket arrays may be created, one for receipt orders, one for issue orders, and one for stock elements.

In the middle portion of FIG. 4, exemplary exploded bucket arrays 16, 18, 20 are depicted that have been created from the input data sets 10, 12, 14. Specifically, the bucket array 16 has been created from the stock-related data set 10, the bucket array 18 has been created from the receipt-related data set 12, and the bucket array 20 has been created based on the issue-related data set 14. Each bucket array 16, 18, 20 includes one or more array fields. An index is assigned to each field of each bucket array. Through the indices, the array fields and their content can be accessed. In FIG. 4, the fields of the bucket array 16 have an index I running from "1" to "8" to designate the eight fields contained in the array 16. Further, the fields of the bucket array 18 are marked by an index J likewise running from "1" to "8" owing to the same number of fields contained in the array 18. Finally, the single field of the array 20 carries an index K, which has a value "1" in the example case.

The data explosion involves generating, for each input data set, an intermediate data set for any combination of values of the secondary key elements of the respective input data set. The intermediate data sets include the same category, quantity and time as the input data set from which they are generated. For example, the data set 10 having (S, V, CK) as the values of its secondary key elements can be exploded into eight intermediate data sets. A first intermediate data set of the input data set 10 can be generated to include to have null values for all secondary key elements, i.e., (-, -, -, t1, C1, q1). The null value "-" may, e.g, be represented by a predetermined binary number containing all zeros or all ones. A second intermediate data set of the input data set 10 can be generated to include the value S for the secondary key element sublocation, resulting in the intermediate data set (S, -, -, t1, C1, q1). A third intermediate data set of the input data set 10 can be generated to include the value V for the secondary key element version, yielding (-, V, -, t1, C1, q1) as the corresponding intermediate data set. Similarly, a fourth intermediate data set of the input data set 10 can be generated as (-, -, CK, t1, C1, q1). Further intermediate data sets of the input data set 10 can be generated to include a combination of two non-null values of the secondary key elements, i.e., V and CK, S and CK, and S and V. A last intermediate data set can be generated to include all the values S, V, CK for the secondary key elements. One will easily appreciate that such last intermediate data set corresponds to the input data set 10 itself.

Thus, the secondary key elements sublocation, version and characteristics of the input data sets define a certain level, and the explosion process can be viewed as involving the generation of intermediate data sets for the same and all higher (more coarse) levels.

The eight intermediate data sets that can be generated in the above fashion from the data set 10 are stored in respective array fields in the bucket array 16. As stated earlier, the array fields of the bucket array 16 are assigned the index I to allow individual access to the information stored in the respective fields. As can be easily seen, the data set 12 can be similarly exploded into eight further intermediate data sets. Unlike the input data set 10, which specifies product stock, the input data set 12 specifies a product receipt. Therefore, the intermediate data sets created from the input data set 12 are stored in a different bucket array, i.e., the array 18.

As for the data set 14, this data set can be mapped onto a single intermediate data set only. The secondary key elements of this input data set define the uppermost level, i.e., the level of the plant itself with no consideration of the parameters sublocation, version and characteristics. As the data set 14 specifies neither stock nor a receipt, but an issue, it is exploded into yet another bucket array reserved for issue orders. In the example depicted in FIG. 4, it is the bucket array 20 that receives the single intermediate data set that can be generated from the data set 14. Of course, depending on the content and number of issue orders, the array 20 may require more than one array field to receive the exploded issue information.

In practical applications, exploded bucket arrays typically include a large number of entries and corresponding array fields.

In a subsequent step of the known method of performing product availability checks, the content of the exploded bucket arrays 16, 18 is used to generate what is referred to herein as ATP stacks. These are data structures that are created and temporarily stored for the purpose of the product availability check. In the ATP stacks, the information from the exploded bucket arrays is aggregated with respect to the categories. Separate ATP stacks are created for different levels. Each ATP stack is filled on the basis of the intermediate data sets in the arrays that belong to the same level as the respective stack. Intermediate data sets that represent issues are subtracted from intermediate data sets that represent stock or receipts. In this manner, the time-dependent free amount of the product or material at a particular level is obtained independent of the category.

On the right-hand side of FIG. 4, eight exemplary ATP stacks 22, 24, 26, 28, 30, 32, 34, 36 are depicted that have been created on the basis of the content of the exploded bucket arrays 16, 18, 20. The ATP stacks 22-36 include a key that consists of the secondary key elements, and further include quantity information in relation to a series of time buckets. For example, the key of the ATP stack 22 is (-, -, -) indicating that this stack is associated with the uppermost level. In other words, the ATP stack 22 provides time-dependent information on the free amount of the product regardless of its sublocation, version and characteristics. The key of the ATP stack 36, on the other hand, is (S, V, CK) indicating that the stack is for the lowermost level. To put it in different terms, the ATP stack 36 provides time-dependent information on the free amount of the product having version V and characteristics CK in sublocation S. The ATP stacks 24-34 provide similar information for intermediate levels.

The principles of aggregating exploded ATP time series data to fill ATP stacks are well-known to a person versed in the art and need not be described in detail herein. To give one example, filling the ATP stack 22 in FIG. 4 requires aggregating the intermediate data set indexed 1 of the bucket array 16, the intermediate data set indexed 1 of the bucket array 18 and the intermediate data set indexed 1 of the bucket array 20. The intermediate data set indexed 1 of the bucket array 16 indicates that the quantity q1 is on stock at time t1 and the intermediate data set indexed 1 of the bucket array 18 indicates that the quantity q2 will be received at time t2. However, the intermediate data set indexed 1 of the bucket array 20 indicates that the quantity q5 has to be delivered at time t5. Thus, the free (available) amount at time t1 is calculated as q1+q2−q5=q6. At time t2, the aggregated quantity at the highest (plant) level is zero.

In the known method of performing product availability checks, indices to array fields of receipt and stock bucket arrays are kept and stored in the ATP stacks. In the example of FIG. 4, both the index I to the stock bucket array 16 and the index J to the receipt bucket array 18 are kept in the ATP stacks 22-36. The indices in the ATP stacks, which can be viewed as pointers to the array fields of the exploded bucket arrays, point to those intermediate data sets of the bucket arrays that have been filled into the ATP stacks first. Through the inclusion of the indices, information about the categories is preserved in the ATP stacks. Specifically, the indices in the ATP stacks allow to disaggregate the information in the ATP stacks to recover category-dependent information. The use of the indices in the ATP stacks implies that the exploded bucket arrays 16, 18, 20 must be first completely filled before the ATP stacks 22-36 can be generated. Thus, a two-step process is performed that results eventually in the ATP stacks, with this process including the creation of the exploded bucket arrays from the input ATP time series data and then the creation of the ATP stacks from the exploded bucket arrays.

Reference is now made to FIG. 5, which illustrates the creation of a category-dependent product availability overview for the various levels according to the conventional method. To obtain such an overview, the information in the ATP stacks 22-36 is disaggregated with regard to the categories utilizing the stored indices to the fields of the bucket arrays 16, 18. The disaggregation is effected by splitting the stack quantities against the quantities indicated in the exploded bucket arrays. The particular manner in which the disaggregation is effected is well-known to those skilled in the art and need not be explained in greater detail here. It suffices to say that the disaggregation process results in a result (display) data set in relation to each category and time bucket on each level. In FIG. 5, a list of such result data sets is depicted on the right-hand side of this Figure. These result data sets, which are commonly designated 38 in FIG. 5, can be displayed, for example, on a monitor of the computer environment in which the product availability check is performed.

With the conventional method of performing product availability checks, the following problem may be encountered. In many industries, products are manufactured and sold in many different versions, sizes, colors, shapes, etc. For example, a steel producing company may manufacture rolls of band steel in a number of different lengths. The length of the roll represents a characteristic of the product. Therefore, ATP time series data have to be generated and maintained for each length. More generally, if large numbers of product characteristics and/or many product versions and/or many sublocations are involved in the product availability check, the aggregation in the ATP time series is small, resulting in a large number of input data sets to the product availability check.

In the conventional method, the exploded bucket arrays are data structures with direct access via an index. Typically, the exploded bucket arrays are sorted primarily by the secondary key elements, i.e., sublocation, version and characteristics. Building up an exploded bucket array then frequently involves the addition of new array fields in intermediate portions of the array. To keep the index consistent, the array has to be copied every time a new entry is added. The permanent copying and resizing of the array during its build-up from the input data sets results in a N*N runtime behaviour (N being the number of input data sets involved in the check). The growing direct-access array therefore requires considerable computing capacity and time. If the number of input data sets increases, the runtime may exceed beyond acceptable levels. This makes the conventional method of performing product availability checks unattractive for cases where large amounts of characteristics and/or many versions and/or many sublocations occur.

Accordingly, there is a need for systems, methods, and articles of manufacture that reduce the computing capacity and time required for performing an electronic product availability check.

SUMMARY

According to one aspect of the present invention, a computer-implemented method of performing a product availability check is provided. The method includes receiving information on a plurality of first electronic data sets, each first data set including a first key and further including a product quantity in relation to a single point of time or time period, the first key including a primary key element and a plurality of secondary key elements, the primary and secondary key elements representative of product-related conditions; deriving, based on the information on the first data sets, information on one or more second electronic data sets, each second data set including a second key and further including product quantities in relation to a series of points of time or time periods, the second key exclusively formed of the secondary key elements; and deriving, based on the information on the one or more second data sets, result information on the availability of one or more products in dependence of time and the primary and secondary key elements.

In the method according to the present invention, the information on the one or more second data sets is generated to further include in each second data set one or more auxiliary data structures. Each auxiliary data structure includes one or more auxiliary data elements wherein each of these auxiliary data elements includes the primary key element, product quantity and point of time or time period as included in a respective contributing first data set, i.e., a first data set that contributes to the time-dependent product quantities in the corresponding second data set.

The present invention enables to generate the information on the one or more second data sets directly from the information on the first data sets. Directly means that no intermediary direct-access data container (as an array) with indexed access to its content must be generated from the input first data sets (i.e., the ATP time series data) before generating the information on the second data sets. It has been found that the second data sets can be filled directly from the information contained in the first data sets using the same principles of aggregation as used in the conventional method for filling the ATP stacks from the exploded bucket arrays.

Category information is preserved in the second data sets through the auxiliary data structures, which are filled with exploded information from the first data sets. Due to the inclusion of the auxiliary data structures in the second data sets, each second data set has its own auxiliary data structure(s) uniquely associated therewith. Thus, no indexing is required for the auxiliary data elements of the auxiliary data structures, and build up the auxiliary data structures is possible in less time and using less computing resources than required in the conventional method for building up the exploded bucket arrays. In particular, the auxiliary data structures may be established as tree-like data structures with time and the primary key element as branching criteria.

As each second data set has associated therewith unique level information in the form of the second key elements, no further level information need be stored in the auxiliary data structures themselves. This allows considerable saving in storage space. It has to be taken into account that in practical applications the key element "characteristics" alone may easily consume a two-digit number of bytes, for example 30 or 40 bytes. In the conventional method, each intermediate data set includes own level information, resulting in large storage space required for storing the bucket arrays. In the method according to the present invention, however, level information is stored only once in relation to each second data set, thus requiring less storage space.

Preferably, auxiliary data structures are established separately for stock-related first data sets, receipt-related first data sets and issue-related first data sets. Thus, the second data sets may include one, two or three auxiliary data structures depending on the type of input first data sets.

The present invention further provides a computer program product comprising program code means adapted to cause a computer executing the program code means to carry out the steps of the method of the present invention. The computer program product may be provided in the form of a computer-readable medium, for example an optical or magnetic disk.

Moreover, the present invention provides a computer system for performing a product availability check, the system comprising processing means configured to receive information on a plurality of first electronic data sets, each first data set including a first key and further including a product quantity in relation to a single point of time or time period, the first key including a primary key element and a plurality of secondary key elements, the primary and secondary key elements representative of product-related conditions; derive, based on the information on the first data sets, information on one or more second electronic data sets, each second data set including a second key and further including product quantities in relation to a series of points of time or time periods, the second key exclusively formed of the secondary key elements; and derive, based on the information on the one or more second data sets, result information on the availability of one or more products in dependence of time and the primary and secondary key elements.

According to the present invention, the processing means are configured to generate the information on the one or more second data sets to further include in each second data set one or more auxiliary data structures, each auxiliary data structure including one or more auxiliary data elements, each auxiliary data element including the primary key element, product quantity and point of time or time period as included in a respective contributing first data set.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described herein.

BRIEF DESCRIPTION OF THE DRAWINGS

The accompanying drawings are incorporated in and constitute a part of this specification and, together with the description, explain the principles of the invention. In the drawings.

DETAILED DESCRIPTION

Reference will now be made in detail to the exemplary embodiments of the invention. Wherever possible, the same reference numbers will be used throughout the drawings to refer to the same or like parts.

Figure 1:
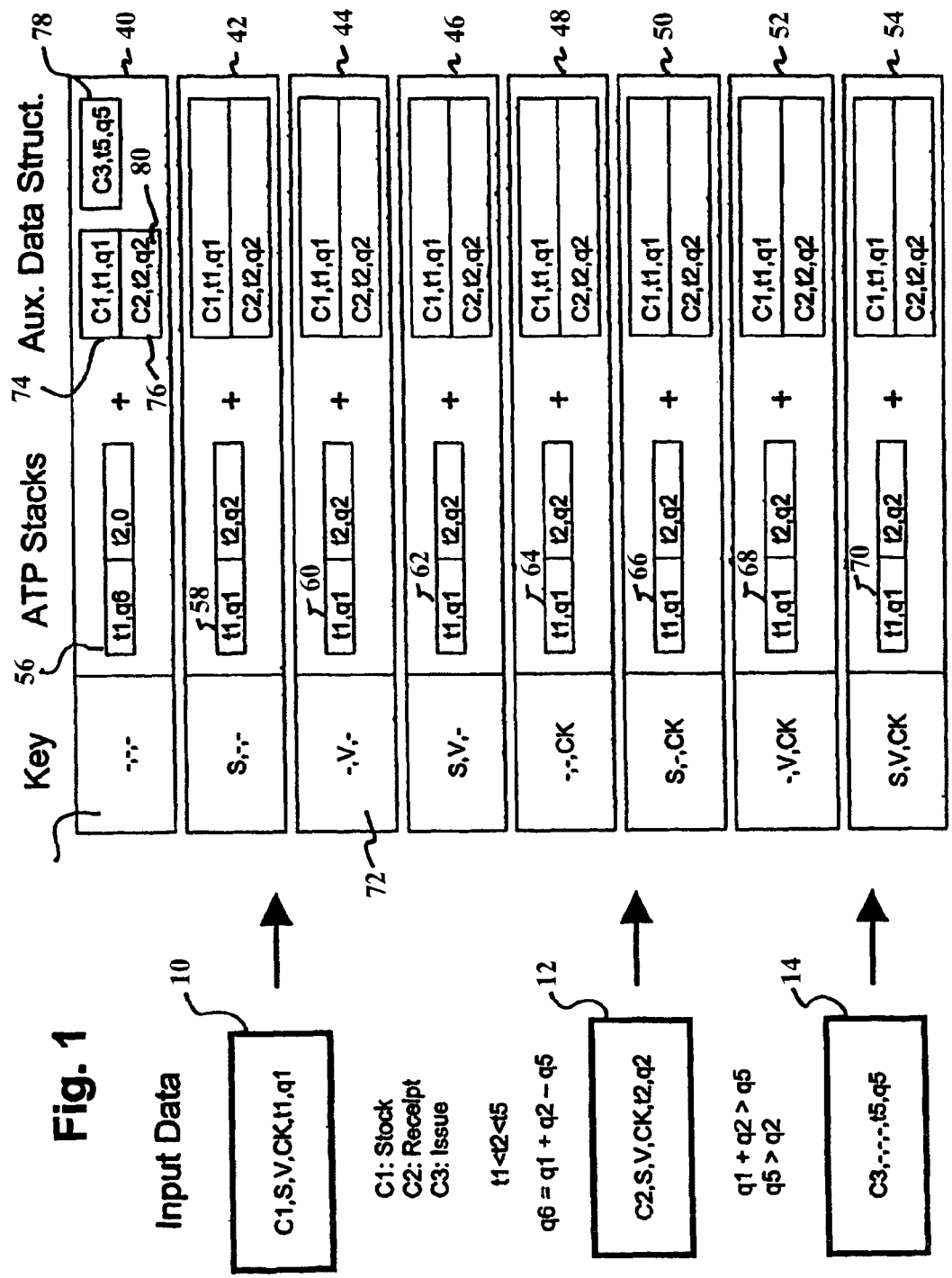
FIGS. 1 and 2 schematically illustrate stages of a procedure for checking the availability of a product according to an embodiment of the present invention.
Figure 4:
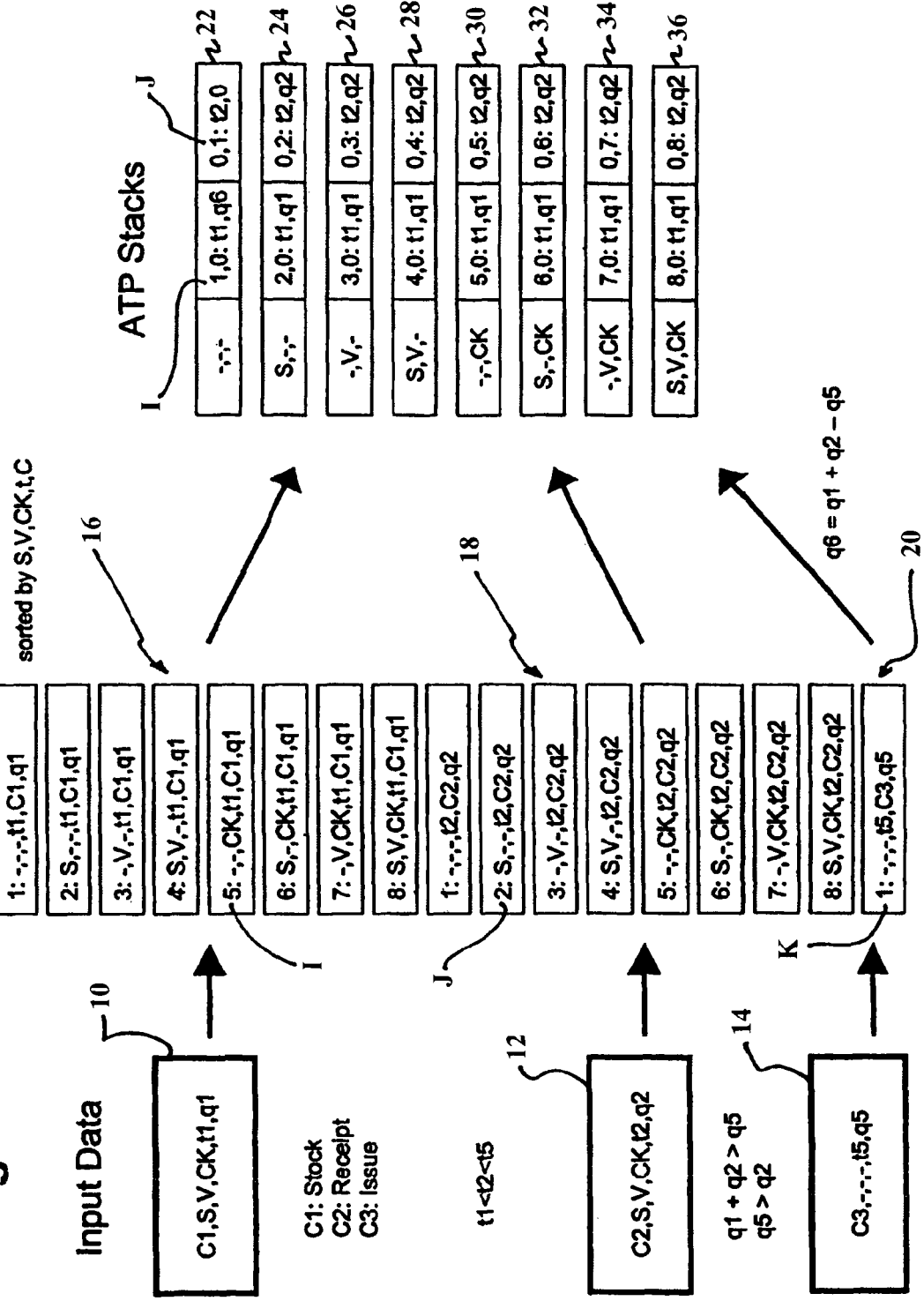
FIGS. 4 and 5 schematically illustrate stages of a conventional procedure for performing product availability checks.

On the left-hand side of FIG. 1, the same data sets 10, 12, 14 (first data sets) as in FIG. 4 are schematically depicted. Again, the data sets 10, 12, 14 are used as exemplary input to the product availability check.

On the right-hand side of FIG. 1, second data sets 40, 42, 44, 46, 48, 50, 52, 54 are shown. The second data sets 40-54 include respective ATP stacks 56, 58, 60, 62, 64, 66, 68, 70 and respective keys 72. The keys 72 are comprised of the secondary key elements sublocation, version and characteristics. Unlike the stacks 22-36 of FIG. 4, the stacks 56-70 include no indices. The time-dependent quantity information contained in the stacks 56-70 is the same as in FIG. 4, as can be easily verified from a comparison of both figures. According to the preferred embodiment, the stacks 56-70 are filled directly from the input data sets 10, 12, 14. Build-up of intermediary indexed bucket arrays is avoided. The explosion of the data sets 10, 12, 14 with respect to the secondary key elements sublocation, version and characteristics is done while the stacks are filled. The same principles of exploding the input data sets and aggregating the exploded data as employed in the conventional method are utilized when filling the stacks 56-70 from the information contained in the data sets 10, 12, 14.

For example, for filling the stack 56 (which represents the plant level without consideration of the sublocation, version and characteristics), the quantity information of all three data sets 10, 12, 14 is aggregated, resulting in the available quantity q6 at time t1 and the available quantity 0 at time t2. Further, for filling the stack 58 (and all other stacks 60-70), only the quantity information of the input data sets 10, 12 is aggregated. The input data set 14 is irrelevant to filling stacks of levels other than the plant level as it requires the issue of the quantity q5 regardless of the sublocation, version and characteristics of the product to be issued.

In this way, the aggregated quantity information in the stacks 56-70 can be derived without resorting to an intermediary data container for storing the exploded input data in indexed form. This allows to generate the ATP stacks in less time and with less computing capacity and makes the method for performing product availability checks according to the present invention attractive and feasible also for cases where a large number of characteristics has to be dealt with. The save in computing resources as provided for by the present invention allows to conveniently utilize such resources for other purposes.

According to the embodiment, the second data sets 40-54 not only include the stacks 56-70, which are filled with time-dependent quantity information aggregated over the various categories, but also category information to enable to derive a category-dependent product availability overview. To this end, each second data set 40-54 additionally includes one or more auxiliary data structures 74, 76, 78. Specifically, the second data sets 40-54 include a first auxiliary data structure 74 reserved for stock-related information (STC), a second auxiliary data structure 76 reserved for receipt-related information (RCP), and a third auxiliary data structure 78 reserved for issue-related information (ISS).

Each of the auxiliary data structures 74-78 includes one or more auxiliary data elements 80, each of which includes the category, time and quantity information from a respective input data set contributing to the aggregated availability information filled into the associated ATP stack. In the illustrated example, the auxiliary data structures 74-78 each include a single auxiliary data element 80 only. This is because the input ATP time series data in the example case contain data for a single category only in relation to each of stock, receipt and issue. Of course, in a practical application, input data sets for more than one category may occur in relation to each of stock, receipt and issue. For example, it may be envisioned that with regard to stock, not only the input data set 10 related to category C1 occurs, but another data set related to a different stock category. Then, the stock-related auxiliary data structure 74 may contain two auxiliary data elements 80, one containing the category, time and quantity information from the input data set 10 and another auxiliary data element containing the category, time and quantity information from the mentioned further stock-related input data set.

As can be easily verified by comparison of FIG. 1 and FIG. 4, the auxiliary data elements 80 in the auxiliary data structures 74-78 of the second data sets 40-54 contain the same category, time and quantity information as the intermediate data sets stored in the exploded bucket arrays 16, 18, 20. In fact, for filling the auxiliary data structures 74-78, the input data sets 10-14 are exploded in a similar manner as is done in the conventional method for filling the bucket arrays 16-20, except that no level (key) information is stored individually in the auxiliary data elements 80. Storage of such level information in the auxiliary data elements is not required owing to the keys 72 included in the second data sets 40-54.

Advantageously, the ATP stacks 56-70 are stored in a tree-like manner in a container, allowing fast insertion and search. The runtime of the product availability check can then exhibit a logarithmic behaviour, which is faster and consumes less computing resources than the quadratic runtime behaviour of the conventional method.

The auxiliary data structures 74-78 are preferably also stored in a tree-like manner in respective containers, similarly allowing fast insertion and search. Searching in the auxiliary data structures 74-78 is also fast because of their comparatively small size. For the auxiliary data structures 74-78, no indexed, direct access linear arrays are needed as no index is kept in the ATP stacks 56-70. Filling the auxiliary data structures 74-78 may be made simultaneously with filling the ATP stacks 56-70.

Figure 2:
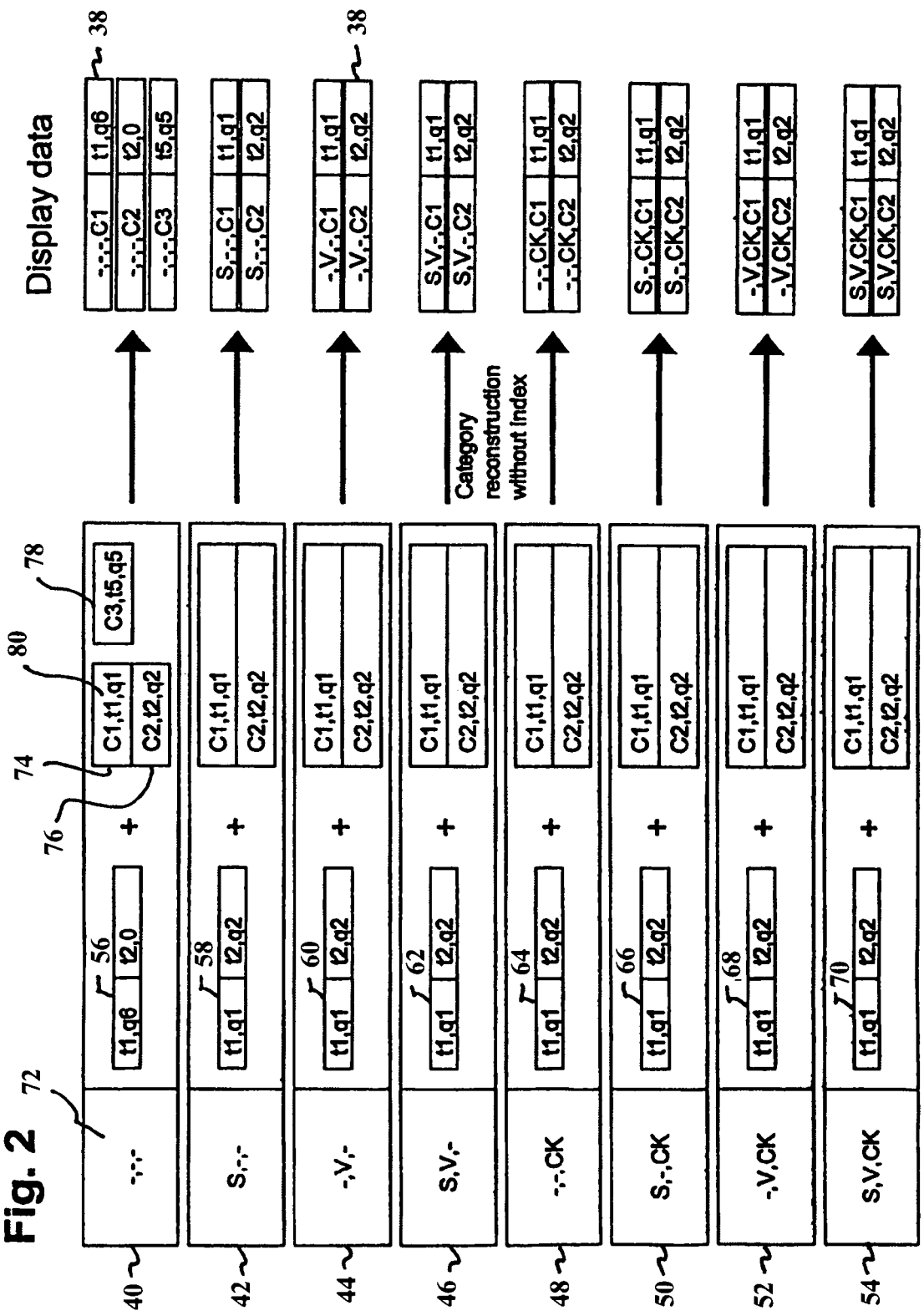
Figure 5:
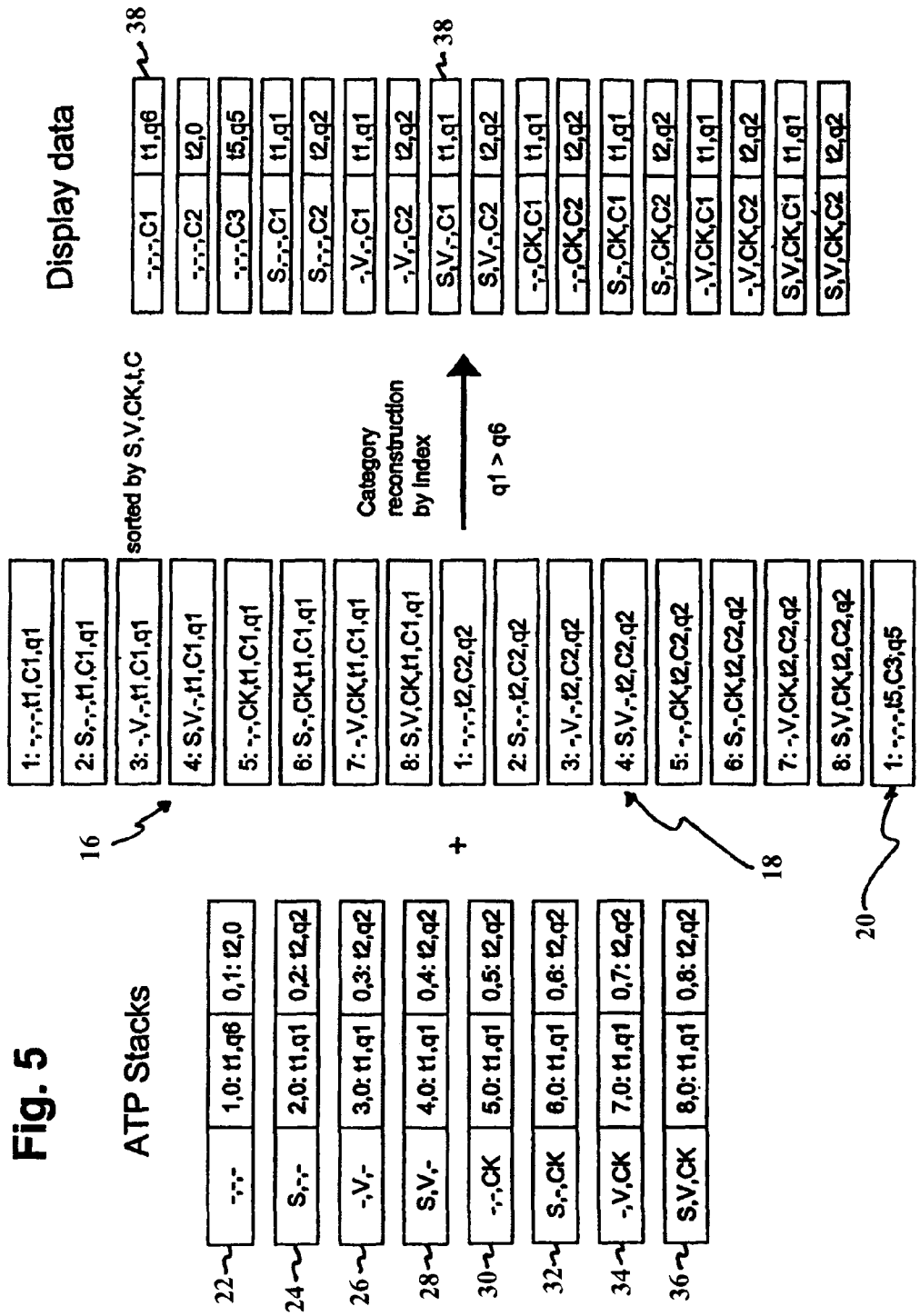

FIG. 2 illustrates the creation of a list of result (display) data sets 38 from the second data sets 40-54. The result data sets 38 are generated by reconstructing category-dependent availability information from the ATP stacks 56-70 using the information in the auxiliary data structures 74-78. As can be easily seen, the result data sets 38 in FIG. 2 are the same as in FIG. 5. Principles of disaggregating the information in the ATP stacks 56-70 and reconstructing the category-dependent availability information are readily available to those of ordinary skills in the art. They may include setting in advance a priority rank for each category to define a hierarchy to be observed when disaggregating the stack information.

Although not shown in the figures, when generating the ATP stacks 56-70, not only the ATP time series data, but also additional data such as correction data may have to be taken into account. Such correction data may, e.g., account for unanticipated delivery delays that are not reflected in the ATP time series data, but require consideration at the time of performing a product availability check. As with the ATP time series data, the additional data flows in no intermediary array before being applied to the ATP stacks.

Figure 3:
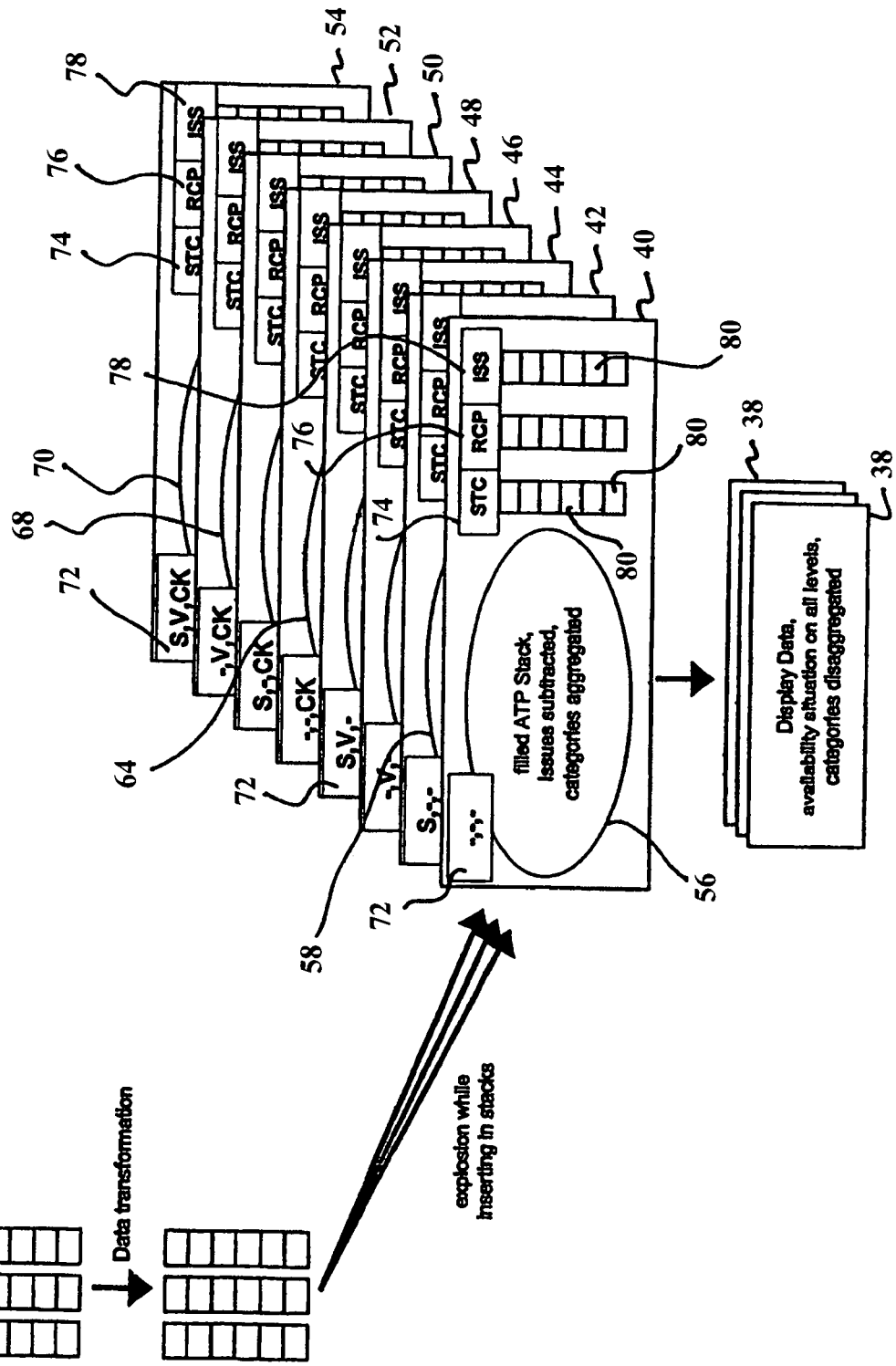
FIG. 3 depicts a schematic overview of a product availability checking procedure according to the present invention.

The schematic overview of FIG. 3 further indicates that a transformation step may be carried out on the ATP time series data prior to its explosion and insertion into the ATP stacks 56-70 and auxiliary data structures 74-78. Such transformation consists in shifting the scheduled reception time of certain or all receipts. Typically, a conservative approach is taken where receipts are treated as being available only at the end of the time bucket in which they fall (e.g., at the end of the day if one day is used as the measure for a time bucket). In this way, confirmation of a requirement can be avoided in a situation where an expected receipt is late for some reason. Occasionally, however, a prospective approach is taken wherein all receipts are considered available already at the beginning of the time bucket in which they fall (for example, if it can be guaranteed that the receipts will all be on time). To this end, the receipts are shifted toward the past by one time bucket. Also, there may be a situation where a receipt that was due in the past is delayed because of a strike, for example. Transformation allows to shift this receipt to a certain day in the future if it is known that the goods will have been received by that day (e.g., because the strike is over). In this way, the anticipated receipt can be included in the product availability check.

The present invention can be implemented on any localized or distributed computer system having suitable processing means to perform the various calculations involved in the methodology of the present invention. In particular, the computer system may be configured as a computer network system having computing and/or storage resources that are shared, and can be accessed, by a number of user computers. For example, the ATP time series data may reside in a central database or cache of the network system.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A computer-implemented method of performing a product availability check, the method comprising:

receiving a plurality of first data sets, each first data set comprising a first key, a time bucket associated with the first data set, and a quantity of products available at the time bucket, the time bucket being a single point of time or time period, the first key comprising a primary key element and one or more secondary key elements, the primary key element being associated with a corresponding priority value, the priority value representing a priority of the first data set within the plurality, and the primary key element being one of stock products, incoming products, or outgoing products, the receiving comprising:

receiving correction data associated with at least one of the first data sets, the at least one of the first data sets being related to incoming products, and the correction data specifying a delay in receipt of a quantity of the incoming products; and adjusting, upon receipt of the correction data, the time bucket associated with the at least one of the first data sets to reflect the specified delay;

deriving a second data set from the received first data sets, the second data set including a second key comprising a combination of the secondary key elements of the first data sets, and further including quantities of products available at the time buckets associated with the first data sets and associated with the combination of secondary key elements, wherein deriving the second data set comprises:

generating an auxiliary data structure for the second data set, the auxiliary data structure being associated with the primary key elements of the first data sets, wherein the auxiliary data structure comprises a quantity of products associated with the primary key element and available at a corresponding one of the time buckets associated with the first data sets; and deriving, based on the auxiliary data structure of the second data set and the priority of the primary key element associated with the auxiliary data structure, result information on the availability of one or more products at the time buckets associated with the first data sets.

2. The method of claim 1, wherein the generating comprises generating a plurality of auxiliary data structures corresponding to stock-related first data sets, incoming-related first data sets, and outgoing-related first data sets.

3. The method of claim 1, wherein the auxiliary data structure is established as a tree-like data structure with time and the primary key element as branching criteria.

4. The method of claim 1, wherein one of the secondary key elements is representative of a product location or sublocation.

5. The method of claim 1, wherein one of the secondary key elements is representative of a product version.

6. The method of claim 1, wherein at least one of the secondary key elements is representative of a product characteristic or a combination of product characteristics.

7. A computer program product tangibly embodied in a computer-readable medium storing instructions operable to cause one or more computers to perform a method of checking the availability of a product, the method comprising:

receiving a plurality of first data sets, each first data set comprising a first key, a time bucket associated with the first data set, and a quantity of products available at the time bucket, the time bucket being a single point of time or time period, the first key comprising a primary key element and one or more secondary key elements, the primary key element being associated with a corresponding priority value, the priority value representing a priority of the first data set within the plurality, and the primary key element being one of stock products, incoming products, or outgoing products, the receiving comprising:

receiving correction data associated with at least one of the first data sets, the at least one of the first data sets being related to incoming products, and the correction data specifying a delay in receipt of a quantity of the incoming products; and adjusting, upon receipt of the correction data, the time bucket associated with the at least one of the first data sets to reflect the specified delay;

deriving a second data set from the received first data sets, the second data set including a second key comprising a combination of the secondary key elements of the first data sets, and further including quantities of products available at the time buckets associated with the first data sets and associated with the combination of secondary key elements, wherein deriving the second data set comprises:

generating an auxiliary data structure for the second data set, the auxiliary data structure being associated with the primary key elements of the first data sets, wherein the auxiliary data structure comprises a quantity of products associated with the primary key element and available at a corresponding one of the time buckets associated with the first data sets; and deriving, based on the auxiliary data structure of the second data set and the priority of the primary key element associated with the auxiliary data structure, result information on the availability of one or more products at the time buckets associated with the first data sets.

8. A computer system comprising one or more computers for performing a product availability check, the system configured to:

receive a plurality of first data sets, each first data set comprising a first key, a time bucket associated with the first data set, and a quantity of products available at the time bucket, the time bucket being a single point of time or time period, the first key comprising a primary key element and one or more secondary key elements, the primary key element being associated with a corresponding priority value, the priority value representing a priority of the first data set within the plurality, and the primary key element being one of stock products, incoming products, or outgoing products, the receiving comprising:

receive correction data associated with at least one of the first data sets, the at least one of the first data sets being related to incoming products, and the correction data specifying a delay in receipt of a quantity of the incoming products; and adjust, upon receipt of the correction data, the time bucket associated with the at least one of the first data sets to reflect the specified delay;

derive a second data set from the received first data sets, the second data set including a second key comprising a combination of the secondary key elements of the first data sets, and further including quantities of products available at the time buckets associated with the first data sets and associated with the combination of secondary key elements, wherein deriving the second data set comprises:

generating an auxiliary data structure for the second data set, the auxiliary data structure being associated with the primary key elements of the first data sets, wherein the auxiliary data structure comprises a quantity of products associated with the primary key element and available at a corresponding one of the time buckets associated with the first data sets; and derive, based on the auxiliary data structure of the second data set and the priority of the primary key element associated with the auxiliary data structure, result information on the availability of one or more products at the time buckets associated with the first data sets.

* * * * *